(12) United States Patent
Hileman

(10) Patent No.: US 6,626,361 B2
(45) Date of Patent: Sep. 30, 2003

(54) MOBILE AUTOMATED DATA COLLECTION DEVICE

(75) Inventor: Martin H. Hileman, Beavercreek, OH (US)

(73) Assignee: The Standard Register Company, Dayton, OH (US)

( * ) Notice: Subject to any disclaimer, the term of this patent is extended or adjusted under 35 U.S.C. 154(b) by 0 days.

(21) Appl. No.: 10/192,401

(22) Filed: Jul. 10, 2002

(65) Prior Publication Data

US 2002/0179711 A1 Dec. 5, 2002

Related U.S. Application Data

(63) Continuation of application No. 09/734,436, filed on Dec. 11, 2000.

(51) Int. Cl.[7] ................................................ G06K 7/10
(52) U.S. Cl. ......................... 235/462.01; 235/462.01; 235/462.46; 235/454
(58) Field of Search ............................. 235/462.01, 454

(56) References Cited

U.S. PATENT DOCUMENTS

| | | | |
|---|---|---|---|
| 4,672,184 A | | 6/1987 | Fujiwara et al. |
| 4,766,297 A | | 8/1988 | McMillan |
| 4,790,504 A | * | 12/1988 | Wills et al. ............... 248/183.2 |
| 4,939,355 A | | 7/1990 | Rando et al. |
| 4,963,721 A | * | 10/1990 | Kohno et al. ................. 186/61 |
| 5,151,581 A | * | 9/1992 | Krichever et al. ........... 235/454 |
| 5,412,193 A | * | 5/1995 | Swartz et al. ................ 235/383 |
| 5,525,788 A | * | 6/1996 | Bridgelall et al. ...... 235/462.08 |
| 5,856,660 A | * | 1/1999 | Bard et al. .............. 235/462.15 |
| 6,003,008 A | * | 12/1999 | Postrel et al. ................... 705/4 |
| 6,056,301 A | * | 5/2000 | Berliner et al. |
| 6,094,642 A | | 7/2000 | Stephenson et al. |
| 6,314,613 B1 | * | 11/2001 | Kuwayama ................. 16/113.1 |

* cited by examiner

Primary Examiner—Thien M. Le
Assistant Examiner—Daniel A. Hess
(74) Attorney, Agent, or Firm—Killworth, Gottman, Hagan & Schaeff LLP

(57) ABSTRACT

A mobile, automated data collection device for the portable, self-contained reading and human-intelligible presentation of printed indicia on an object. The automated data collection device includes a container, a detector, a controller to coordinate the transfer of electrical signals to and from the detector, an extensible arm connected on its proximal end to at least one of the container or components therein and on its distal end to the detector, and a display to present the information corresponding to data received from the detector in human-intelligible format. The container is equipped with wheels, at least one handle and a closeable cover so that the detector, controller, arm and display can fit inside when not in use such that the entire device can be carried by a human user from location to location. In addition, all of the components within the device can be shielded from ambient conditions, including moisture- and particulate-rich environments. Upon the placement of the device near moving items bearing printed indicia, such as packages riding a conveyor belt, human intervention into the process of reading printed indicia is thus minimized or abrogated.

27 Claims, 4 Drawing Sheets

MOBILE AUTOMATED DATA COLLECTION DEVICE

This application is a continuation of U.S. application Ser. No. 09/734,436, filed Dec. 11, 2000.

BACKGROUND OF THE INVENTION

The present invention relates generally to apparatus that can detect and process printed indicia, such as that found on bar codes and matrix arrays, and more particularly to a self-contained, portable device that fully automates the steps used to acquire the indicia such that the device can be used in myriad environments where constant human interaction is impracticable, dangerous or both.

Bar code and related scanning devices are well known in the art. Such devices utilize a light-emitting transmitter to shine light on indicia either printed directly on a surface of a package, or affixed to a label, which in turn is adhered to the package. A portion of the light reflected from the printed indicia is captured by a receiving sensor, which converts the fluctuating reflections into a continuous analog signal. Electrical circuitry within the scanning device converts the analog signal to a digital equivalent, processes the information with reading circuitry according to predefined codes or algorithms, and compares the information against known criteria. When a match is achieved, a signal is sent to an output device, thereby producing human-intelligible information corresponding to salient features of the scanned item, such as description of the contents, price, weight, and the like. The more popular variants of bar code scanning devices are either autonomous portable, hand-held units, or large, stationary devices integrated with other machinery. The retail checkout environment has proven to be a popular end-use for both the portable and stationary variants of this technology, with U.S. Pat. Nos. 4,766,297 and 4,939,355 representative of the former and latter, respectively. Other commercial and industrial uses for such a system are also widespread; a recent example of such a system for the tracking of inventory or packages in transit is described in U.S. Pat. No. 6,094,642.

Advantages of known portable systems include compactness, flexibility of use, and relatively low acquisition and operating costs. The larger stationary systems, on the other hand, can more readily accommodate automation features that reduce the need for constant human intervention in the scanning process. Such automation can be an important attribute in situations involving harsh environments, where the environment itself could be deleterious to personnel health or safety. An additional benefit to including automation features is that opportunities for human-induced error are minimized, since excessive human participation introduces potential problems in data collection, sequencing, timing and accuracy. However, prior art stationary systems, while providing hands-free operation, tend to be heavy and complex, and thus not sufficiently mobile. In addition, many prior art automated systems are highly integrated with the host transport or conveyance machinery, such that power, trigger and control (such as a "halt process" command in the event an error is detected) is supplied via dedicated interconnects between the system and the machinery. This militates against system autonomy, and hence adaptability to myriad operating environments. Moreover, prolonged use of fully automated, unattended systems can lead to excessive wear of the equipment, even when the equipment is not in actual use. Additional problems can arise when such a system is deployed in environments that could induce misregistration and other similar erroneous data scans, such as where high vibratory loads are present. Common portable devices, on the other hand, such as hand-held lasers, wands and charge-coupled devices (CCDs), while inexpensive and flexible, generally require some degree of human attention, whether it is to activate the scanner (often by a trigger or similar switch), or to place the item to be scanned in a preferred alignment with the scanning device. While some automation features have been incorporated into handheld devices, providing triggerless scanning capability and direct transfer of data to storage, display or an external device, the prior art has not combined many of the valuable attributes of the portable and stationary systems into a self-contained package that provides the flexibility of portable systems with the functionality of larger, stationary units.

Accordingly, there is a need for an image-sensing device that can provide reliable reading of information found on data-containing labels and the like, with a self-contained device configuration that is readily adaptable to system mobility (i.e., transport, setup and operation) requirements.

BRIEF SUMMARY OF THE INVENTION

This need is met by the present invention wherein a portable, stand-alone, self-contained system for reading printed indicia is disclosed. In the present context, "reading" an image encompasses a broad range of sensing functions, including the detection of an image by either active or passive means, whereas "scanning" an image is limited to the narrower subset whereby the reading is accomplished solely through an active device. With an active device, a receiver optically coupled to a dedicated coherent light-emitting transmitter detects reflections of light emanating from the transmitter, while a passive device detects random or incoherent background reflections or scattering from a diffuse light source, whether coupled to the detector or not. An example of the former is a laser with coupled photodetector, where the latter can be characterized by a conventional camera. According to one embodiment of the present invention, the system is a mobile automated data collection device that includes a rigid container (alternatively referred to as a housing or enclosure). The container itself is made of a base portion, which includes one or more internal compartments, a cover portion connected to the base and a handle. The device further includes a controller to send, receive and process electrical information, an extensible arm mounted at one end to the container or controller, and at the other end to a detector. The detector is comprised of an image-sensing apparatus (either a passive device, such as a camera, or an active device, such as a laser scanner), and circuitry to communicate images read by the image-sensing apparatus to the controller or related image-processing apparatus. The apparatus further includes a display in electrical communication with the controller such that, upon receipt of information from the detector, the controller instructs the display to show human-intelligible information corresponding to data contained in the detected image. The container's one or more compartments can be adapted to receive and store the display, controller, extensible arm and detector when these components are not in use, while the handle allows a user to carry the device from one data collection location to another. By virtue of the stand-alone nature of the device, transport-induced vibrations (such as from a moving conveyor or production line) are not transmitted to the optically sensitive detector, thereby reducing the likelihood of vibration-related misreading. An additional benefit to being stand-alone is that it is easy to uncouple the system and move it to any transport machinery environment.

Optionally, the present embodiment includes pivotal mounting features for the extensible arm and the detector. Within the extensible arm is at least one tension spring and at least one locking joint. These features permit the arm to accommodate virtually any detector position needs. The wheels and the handle may be retracted to reduce the size of the container footprint, while the wheels may be locked to prevent unintentional movement during system operation. The construction of the container is such that when the cover and base (which can be hingedly attached) are closed, the container provides environmental shielding, offering protection against one or more forms of moisture or particulate contamination of the components disposed inside. The container's one or more compartments can optionally house an information processing apparatus, which can then be electrically coupled to both the controller, as well as a second information processing apparatus, the latter through one or more data interchange ports mounted within the container.

According to another embodiment of the present invention, a container for a printed indicia reading device is disclosed. The container includes a rigid carryable enclosure that itself includes a base portion with at least one compartment disposed therein for storage of one or more components of the printed indicia reading device, a cover portion detachably connected to the base such that when the enclosure is closed, it provides environmental shielding of the internal components, and a handle to facilitate carrying of the device by a human user. The container further includes retractable wheels similar to that of the previous embodiment, as well as an articulating extensible arm mounted at a proximal end to the enclosure to permit multiple preferential positioning of the arm's distal end. Optionally, the extensible arm includes the tension spring and locking joint arrangement of the previous embodiment, where the mounting arrangement produces a frictional, pivotal connection. Other options include the ability of the handle to retract into a recess in the enclosure, as well as environmental shielding similar to that discussed in conjunction with the previous embodiment. In addition, as with the previous embodiment, the wheels can include a locking feature to inhibit unintentional container motion. The container may further be outfitted with one or more data communication ports to facilitate the exchange of information between an optional information processing apparatus disposed within one of the compartments in the base and another information processing apparatus located outside the container.

According to another embodiment of the present invention, a method of using a mobile automated data collection device to read an object containing printed indicia is disclosed. The steps according to the method include: placing the device in operative proximity to a medium for transporting the printed indicia; deploying a detector, extensible arm, controller and output device, all of which can be contained within a storage container, such that the detector, controller and display are in electrical communication with one another, and further such that the detector mounts to the extensible arm, which in turn mounts to at least the container or controller to establish a mechanical communication therebetween. Additional steps include: transporting the object containing the printed indicia past the mobile automated data collection device so as to be in optical communication with it; sensing the presence of the object bearing the printed indicia; sending an input signal to the controller to indicate that the printed indicia is in optical communication with the mobile automated data collection device; having the detector read light reflected from the printed indicia; converting the reflected light to a digital representation of the information contained in the printed indicia; processing the digital representation in the controller so as to present data corresponding to the information contained in the printed indicia to an output device; and presenting the data corresponding to the information contained in the printed indicia in human-intelligible format with the output device.

Other objects and advantages of the invention will be apparent from the following description, the accompanying drawings and the appended claims.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
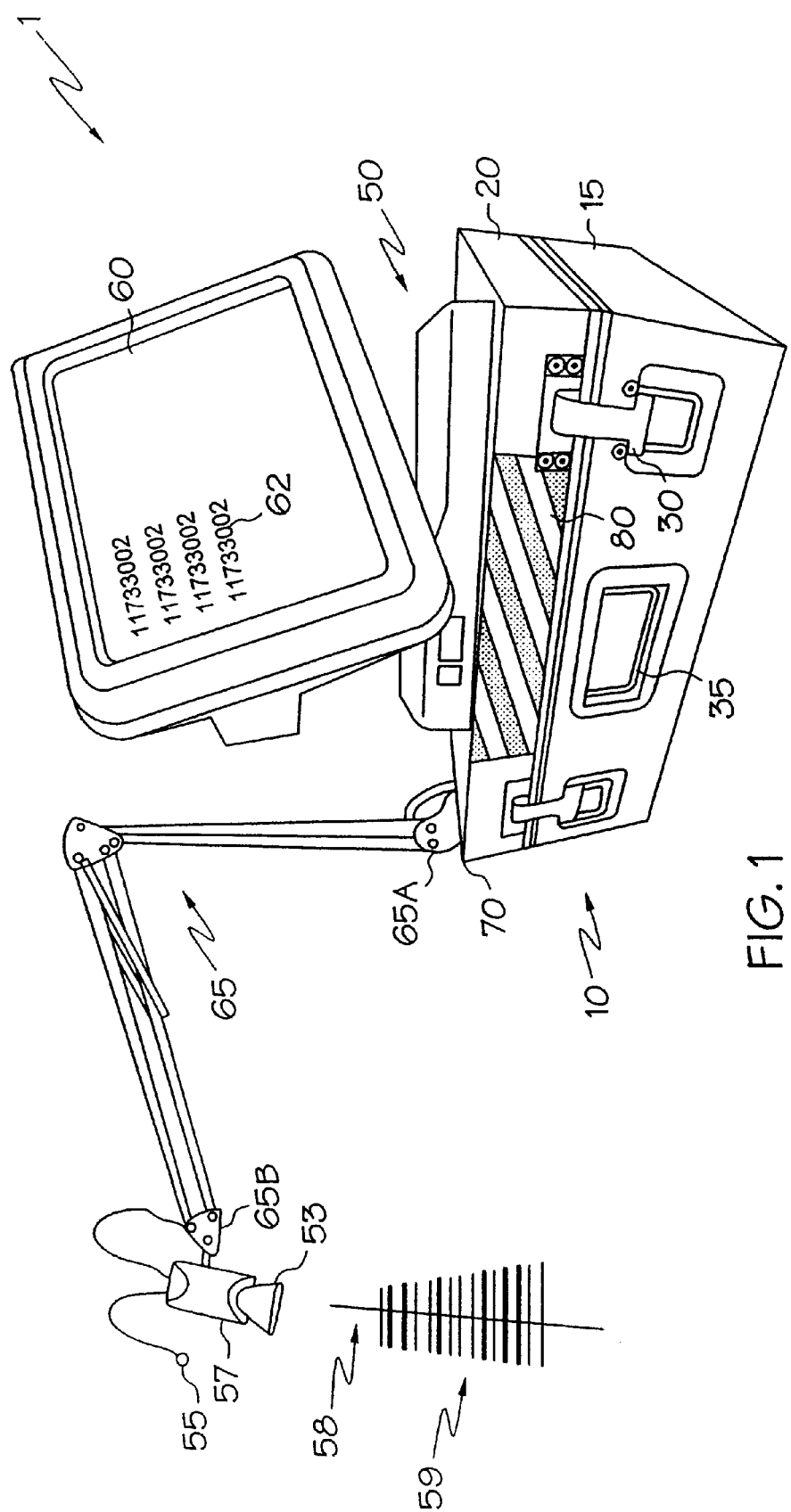
FIG. 1 is an illustration of a self-contained mobile automated data collection device according to an aspect of the present invention.
Figure 2:
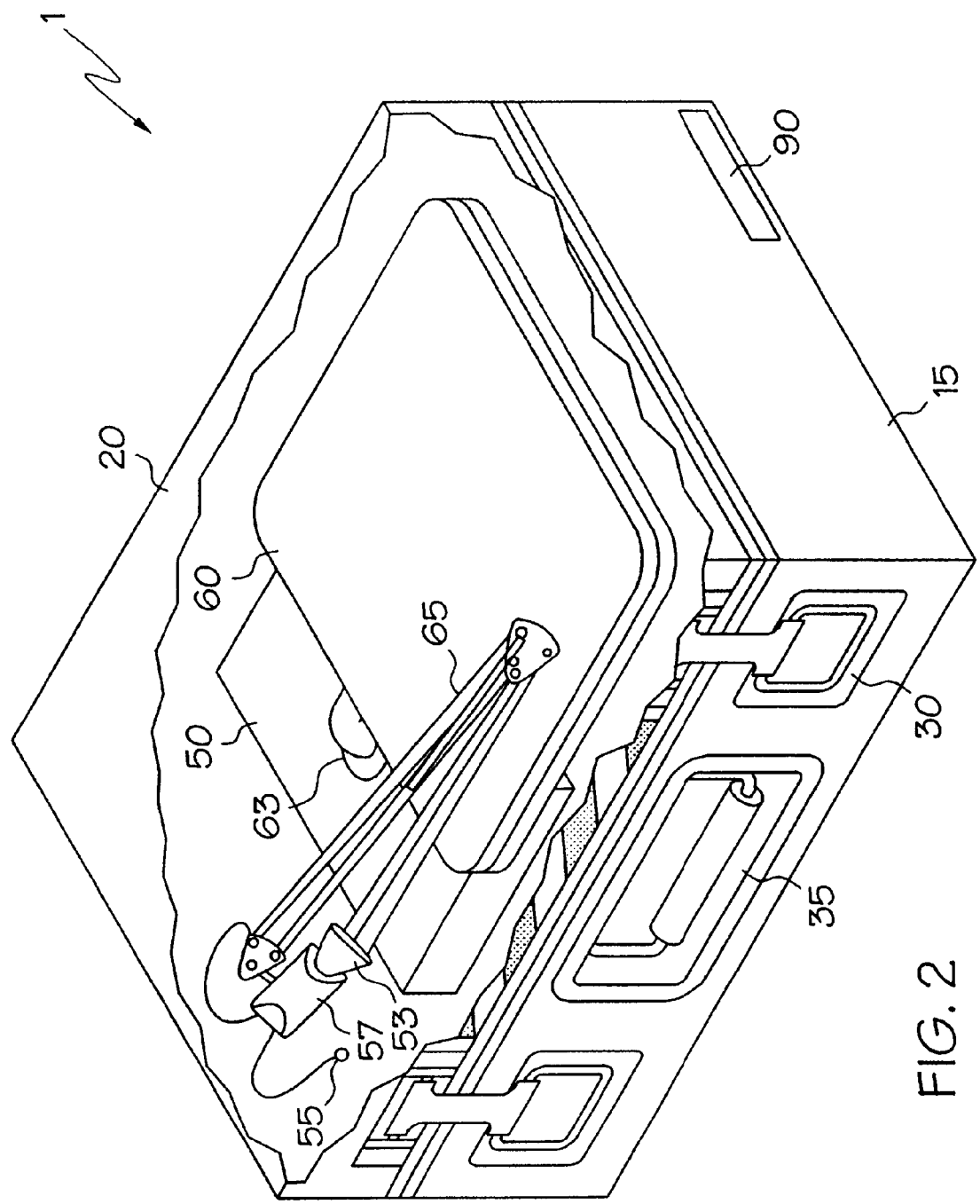
FIG. 2 is an illustration of the self-contained mobile automated data collection device of FIG. 1, showing the components in their stored position.
Figure 3:
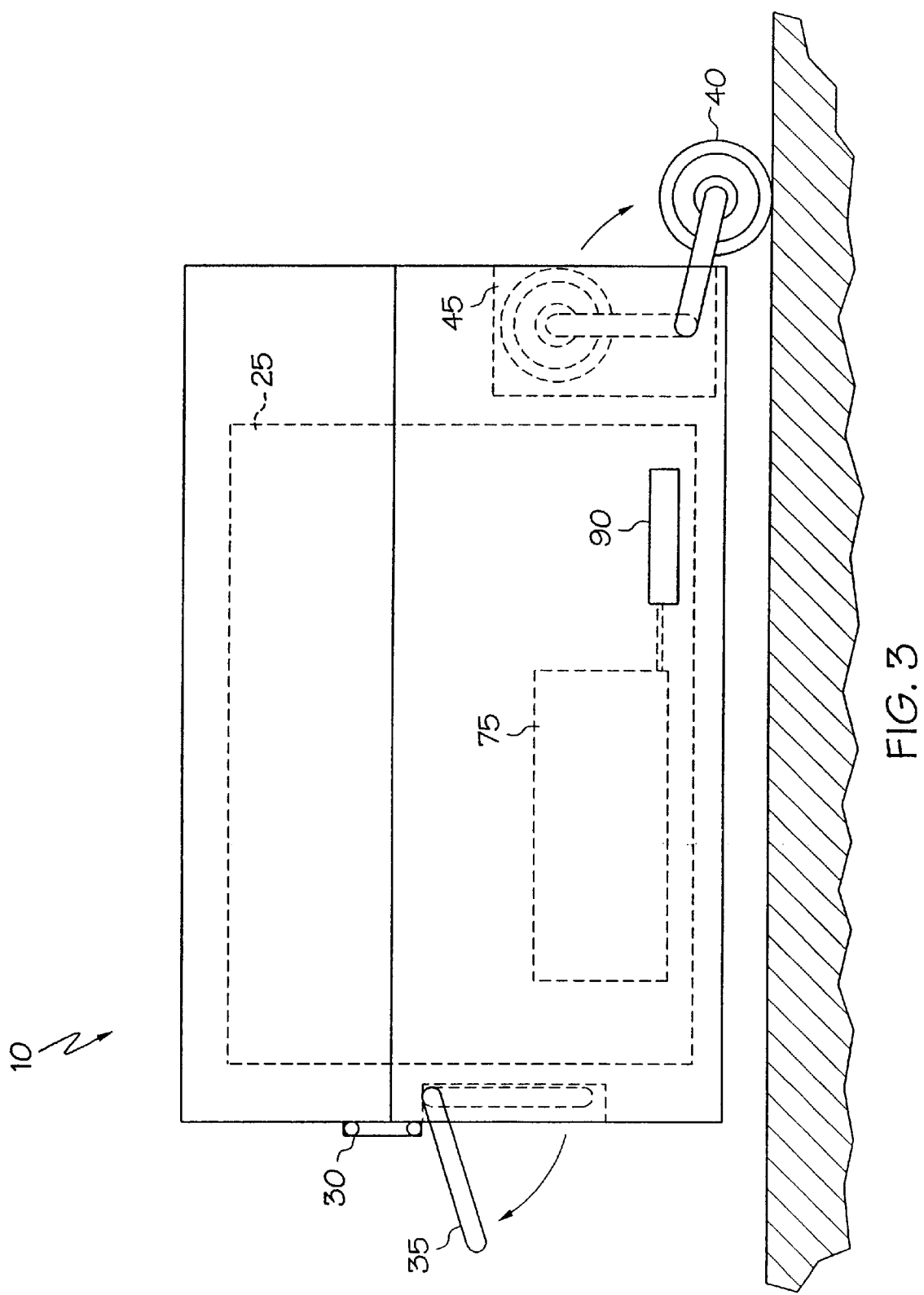
FIG. 3 is an elevation view of the container of self-contained mobile automated data collection device of FIG. 1.

Referring initially to FIGS. 1 through 3, a mobile automated data collection device 1 according to an embodiment of the present invention is disclosed. The device includes as its main structural member a container 10. The container 10 includes a base portion 15 and a cover portion 20 that is connected (preferably detachably) to the base portion to facilitate access to one or more internal compartments 25. In addition, the construction of the container 10, with base and cover portions 15 and 20, respectively, is such that environmental shielding, including protection from stray moisture and particulate contamination, of the sensitive electronic components is provided. In the present context, the cover is considered "detached" not only in situations where it is entirely removed from the base, but also if moved to an open position while still connected (such as by a hinge mechanism) to the base such that access to the container's internal compartments is enabled. Preferably, the detachable connection between the base portion 15 and the cover portion 20 is effected by hinges 30. The container 10 further includes a handle 35 and one or more wheels 40, all of which enhance the transportability of the mobile automated data collection device 1. As is clearly shown in the figures, the various electronic components (discussed in more detail below) are designed to fit into the one or more internal compartments 25 of the container 10. The container is sized such that upon storage of the various electronic components inside, an individual can grasp the container by the handle and pick up the device. It will be appreciated by those skilled in the art that while the device shown with particularity in FIG. 2 is approximately the size of a suitcase, the size of the container 10 is largely dictated by the size of the electronic componentry that fits inside. The wheels may be retractable into recesses 45 in container 10 so as to not protrude beyond the container's footprint during certain operational conditions. Optionally, at least one of the wheels is lockable, such that if it is desired to leave the wheels in their extended position during system operation, the locking mechanism will inhibit unwanted rolling motion of the device 1.

A controller 50 acts as the main electric signal transfer and routing center for signals to and from a detector 53 and an optional information processing apparatus 75, which is preferably in the form of a portable computer. In addition to directing reading activities based on input from a trigger sensor 55, the controller is used to receive decode streams of data from detector 53. In the present context, a "detector" can be either a passive device, such as a conventional camera, or it can be an active device. In the former case, the light, which is typically diffuse (in that phase content is random), can either be from a dedicated lamp placed in operative proximity to the camera, or from an existing background source, such as interior lighting or natural sunlight. In the latter case, the detector would include a scan engine 57 (which is, in effect a transmitter) that provides a beam of coherent light, typically a beam of laser light, and a receiver (not shown) with which to sense reflections of the transmitted light from an indicia-bearing image. It is noted that the active light-emitting source can encompass light sources outside the approximately 400 to 700 nanometer wavelength visible spectrum. Hence, in the present context, the word "light" includes not only those bands corresponding to visible wavelengths, but also other forms of radiation (microwave, infrared, ultraviolet, x-rays and gamma rays) within the electromagnetic spectrum that are capable of being detected by conventional electro-optic means. The detector 53 receives light 58 (either a beam in the case of an active transmitter, or a diffuse pattern in the case of a passive background source) that has been reflected from printed indicia 59, such as a bar code, where symbols (typically in the form of variable-width alternating light and dark rectangular bars) are encoded with information pertaining to the object to which the printed indicia is affixed. In the present context, "printed indicia" includes machine-readable symbols bearing encoded information such that, upon detecting, conversion and processing of the encoded information, human-intelligible information can be presented via output device, such as an electronic display, indicator lights or printed hard copy. In the present embodiment, the output device is preferably a display screen 60. The reflected energy impinging on the receiver is first converted to a continuous analog signal, which can be converted to a digital equivalent with decode circuitry, conversion algorithm or a combination of both. It is then routed to the controller 50, which takes this information and sends it to either the information processing apparatus 75 (when comparison data is voluminous) or, after performing self-contained comparison of the data (in situations involving smaller amounts of comparison data), to the display screen 60 for the generation of the information in human-intelligible format 62. Display screen 60 is preferably mounted via pivotal mount 63 to either controller 50 (as shown in FIG. 2), or to the compartment 25 (not shown) to permit 360° rotation. An extensible arm 65 is mounted at its proximal end 65A to either the controller 50 or the container 10. The distal end 65B of the arm 65 connects to detector 53. Safety of the device can be enhanced by the addition of conventional warning labels 80 to alert personnel in the vicinity of device 1 as to any functional or health warnings such as use of microwaves, laser beams and the like, as well as to the presence of device 1, thus reducing the potential for tripping and related harm. One or more ports 90 are included to permit the exchange of data between any of the components disposed within container 10 (such as controller 50 or information processing apparatus 75) and an external device, such as another information processing apparatus (not shown). Port 90 enhances the level of integration possible between device 1 and an external transport or conveyor (not shown) while still preserving the inherent adaptability of the autonomous device 1 to other operating environments or configurations.

Figure 4:
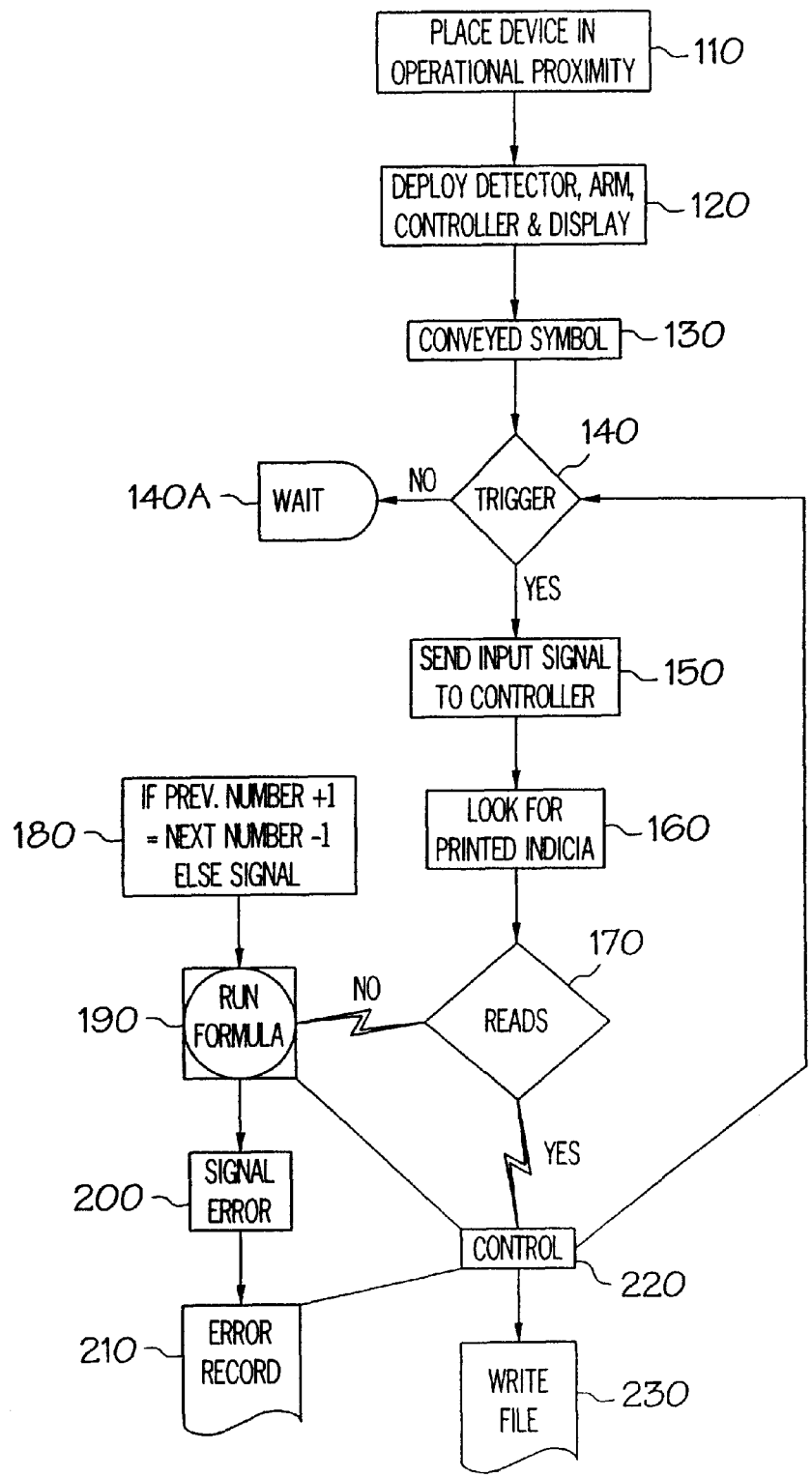
FIG. 4 shows a flow chart of the steps for scanning a printed indicia with a device according to an aspect of the present invention.

Referring now to FIG. 4, a flow chart demonstrating a method of using a mobile automated data collection device according to an aspect of the present invention to scan an object containing printed indicia is shown. The automated features of the present device make it particularly well-suited to use in any environment where human intervention is dangerous, impractical or both. While the present invention is ideal for use in reading numbered cards and documents as they are manufactured, it also has particular utility as a quality control device, such as operating in series with a stationary scanner to monitor its accuracy. In such a scenario, the present invention can be used as a temporary or back-up device, when a fixed or primary scanning station is down, or as a second reader to monitor cards affixed to a carrier, assuring matching numbers. Because of its portable nature, the device of the present invention could also be used in a "field" situation, for example, to conduct on-site investigations in response to customer complaints. The construction of the containment structure is such that it provides increased protection for the sensitive electronic components disposed inside against harmful environments (including moisture and radio frequency (RF) radiation) while providing human-carryable features to facilitate its use in various or hard to reach locations. It is also appropriate in situations involving a continuous, repetitious flow of objects bearing printed indicia, such as a conveyor-based production line, warehouse or package delivery and storage system.

In the first step 110, the mobile automated data collection device is placed in operative proximity to a medium for transporting one or more objects, such as boxes and related packages containing goods. The mobile automated data collection device includes a container to house all of the components (detector, extensible arm, controller and display) needed to read printed indicia affixed to a surface of the objects. Once the device is in place, which is typically adjacent to, but preferably not in contact with, a moving conveyor, the detector, extensible arm, controller and display are deployed in step 120 such that the detector, controller and display are in electrical communication with one another, and further such that the detector mounts to said extensible arm, which in turn mounts to either the controller 50 or the container 10 to establish mechanical communication between them and the detector. Hinge and friction attributes of the extensible arm 65 permit a full range of translational and rotational movement of the detector 53, thereby ensuring proper alignment between detector 53 and printed indicia 59 affixed to an object. Once device 1 is in place, the transporting of the one or more objects containing printed indicia 59 past the detector 53 is commenced, as shown in step 130. Note that this step can be automated, as in the case of a continuous conveyor, or performed manually. When an object containing printed indicia 59 comes in optical communication with the trigger sensor 55, as shown in step 140, the trigger sensor 55, which is an active transmitter, such as a motion detector using radio-frequency (RF) energy, sends an input signal to the controller 50, as shown in step 150. It is noted that until an object bearing printed indicia 59 is brought into the field of view of the trigger sensor 55, the system remains in a "wait" condition, as shown in step 140A; by not leaving the detector 53 in a constant "on" mode, system power usage is conserved, resulting in longer operating cycles, as well as longer component life. This power-saving feature is a desirable attribute in situations when the power source is self-contained, such as from a battery.

Upon receipt of the input signal from the trigger sensor 55, the controller 50 sends a signal to the detector 53, directing it to look for printed indicia 59, as shown in step 160. Consistent with the remainder of the description found herein, step 160 can be accomplished with a passive camera or an active scan engine 57, either of which are directed by the controller 50 to turn on when the presence of indicia-bearing object is detected. In step 170, the detector responds to the light 58 reflected off printed indicia 59, and converts the discrete fluctuations into a continuous analog signal, which in turn is converted into a digital equivalent. From there, it can be processed and compared against a known database. In detector 53 configurations involving an active scanning device, the detector's scan engine 57 scans at a rate of 30–300 scans per second (sps), ensuring that the detector is getting multiple exposures of the printed indicia, thereby promoting accurate reads with a high degree of read rate success. The converted data is further subjected to a program to relate the digital representation to output-suitable format. This output-suitable format is designed to be in some form of human-intelligible data, such as alphanumeric characters 62 on a display screen 60 or paper copy (not shown), or to one or more (possibly color-coded) indicator lights (not shown) on a panel in an industrial, laboratory or commercial setting. If a read failure occurs in step 170, a "no" signal is sent to step 190, which is then instructed to run a formula, such as an error-checking formula to test for consecutive numbers as shown in step 180. If a mismatch is detected, an error signal is generated, as shown in step 200. Note that this signal can, in addition to being used to write a specific type of file to step 230 (discussed below) upon error detection, optionally be used to halt an erroneous reading process. Step 210 shows a record of detected errors, which may be fed to controller in step 220. From here, the error record may be printed out, displayed, or recorded into an error file, as shown in step 230, which can include a master file of all data read. Optionally, the master file of all data read from step 210 can be utilized later for file management and handling, such as reconciliation, remakes, manual data collection override, or simple report. Additional steps can include placing at least one communications port 90 in operative cooperation with an external information processing apparatus (not shown) to transmit a written file 230 for storage, further analysis or archiving.

It is recognized that the present invention could be extended to read not just one and two-dimensional bar codes and matrix arrays, but also printed matter of optically recognizable characters. Thus, having described the invention in detail and by reference to preferred embodiments thereof, it will be apparent that modifications and variations are possible without departing from the scope of the invention defined in the appended claims.

What is claimed is:

1. A method of using a suitcase-style mobile automated data collection device to read printed indicia disposed on an object, comprising the steps of:

placing said mobile automated data collection device in operative proximity to a medium for transporting said object, said mobile automated data collection device including a suitcase-style container configured with at least one compartment therein to hold at least a detector, substantially rigid extensible arm coupled to said detector, controller, trigger sensor and output device;

mounting said detector to said extensible arm;

substantially removing said detector and said extensible arm from said compartment;

deploying said detector, extensible arm, controller, trigger sensor and output device such that said detector, controller, trigger sensor and output device are in electrical communication with one another;

rigidly positioning said arm and said detector to be in a preferred scanning position relative to said object such that once positioned, said detector need not be held by a human user in order to read printed indicia disposed on said object;

transporting said object past said mobile automated data collection device such that said object is in optical communication with said trigger sensor;

sensing the presence of said object;

sending an input signal to said controller to indicate that said object is in optical communication with said mobile automated data collection device;

directing said detector to read said printed indicia in response to said input signal;

reading light reflected from said printed indicia in said detector;

sending data corresponding to said reflected light to said controller; and presenting said data in human-intelligible format to said output device.

2. The method of claim 1, wherein said medium for transporting said object is a continuous conveyor.

3. The method of claim 1, wherein said detector further comprises a transmitter to generate a light emitting source and a receiver to detect said light which has reflected off said printed indicia.

4. The method of claim 1, wherein said medium for transporting said object containing printed indicia includes manually placing and aligning said object.

5. The method of claim 1, further comprising the step of providing indication to a user the scan status of said object containing printed indicia.

6. The method of claim 5, wherein said step of providing indication to a user the scan status of said object containing printed indicia includes the presentation of a signal upon detection of a read error.

7. The method of claim 1, further comprising the step of halting the reading process upon receipt of an error signal.

8. The method of claim 1, further comprising the steps of:

placing at least one communications port in operative cooperation with an information processing apparatus; and transmitting an electrical signal containing said data corresponding to said reflected light from said printed indicia to said at least one communications port.

9. A method according to claim 1, wherein said step of directing said detector to read said printed indicia in response to said input signal comprises instructing said detector to change its operating condition from a first state into a second state.

10. A method according to claim 9, wherein said first state is a wait condition and said second state is an on condition.

11. A mobile automated data collection device for portable reading of printed indicia, said device comprising:
   a suitcase-style container comprising:
      a base portion;
      a cover portion in cooperation with said base portion such that at least one compartment is defined therebetween, said cover portion selectively openable relative to said base portion such that during periods of storage or transport of said device said compartment is substantially enclosed within said container, while during periods of operation of said automated data collection device said compartment is substantially open; and
      a handle coupled to at least one of said base portion or said cover portion such that said container can be carried in a suitcase-like fashion by a single human user;
   a detector disposable in said compartment such that upon opening of said cover portion relative to said base portion, said detector can be selectively removed from said compartment and placed adjacent an object to be read;
   a rigidly positionable extensible arm coupled to said detector and said container, said extensible arm disposable in said compartment such that upon opening of said cover portion relative to said base portion, a substantial entirety of said extensible arm can be selectively removed from said compartment and placed in a substantially fixed spatial position, said extensible arm comprising:
      a proximal end; and
      a distal end upon which said detector is mounted;
   a controller configured to receive and process a plurality of electrical signals sensed by said detector, said controller disposable in said container;
   a trigger sensor in electrical communication with said controller, said trigger sensor to automatically detect the presence of an object containing printed indicia and send an input signal to said controller upon said presence; and
   a display responsive to said controller and configured to present human-intelligible information corresponding to data received from said detector, said display disposable in said container.

12. A mobile automated data collection device according to claim 11, wherein said detector is pivotally mounted to said distal end of said extensible arm.

13. A mobile automated data collection device according to claim 12, wherein said detector includes:
   a light emitting source; and
   a receiver for detecting light emitted from said light emitting source once said light has been reflected from said printed indicia.

14. A mobile automated data collection device according to claim 11, wherein said trigger sensor is cooperatively coupled to said controller and said detector such that said detector remains in a inoperative first state when said trigger sensor does not detect the presence of an object containing printed indicia, and converts to an operative second state when said trigger sensor does detect the presence of an object containing printed indicia.

15. A mobile automated data collection device according to claim 14, wherein said first state is a wait condition and said second state is an on condition.

16. A mobile automated data collection device according to claim 11, wherein said proximal end of said extensible arm is pivotally connected to permit preferential positioning of said extensible arm.

17. A mobile automated data collection device according to claim 11, wherein said handle is retractable into a recess in said container.

18. A mobile automated data collection device according to claim 11, wherein said display is pivotally mounted to either said container or said controller.

19. A mobile automated data collection device according to claim 11, wherein said container is environmentally shielded.

20. A mobile automated data collection device according to claim 19, wherein said environmental shielding includes moisture shielding.

21. A mobile automated data collection device according to claim 19, wherein said environmental shielding includes particulate shielding.

22. A mobile automated data collection device according to claim 11, further comprising a plurality of wheels mounted on at least one surface of said container.

23. A mobile automated data collection device according to claim 22, wherein said plurality of wheels are retractably mounted.

24. A mobile automated data collection device according to claim 22, wherein at least one of said plurality of wheels further includes a locking feature to inhibit container motion.

25. A mobile automated data collection device according to claim 11, wherein said container is adapted to house a first information processing apparatus in electrical communication with said controller.

26. A mobile automated data collection device according to claim 25, wherein said container further includes at least one port to effect communication between said first information processing apparatus and a second information processing apparatus.

27. A mobile automated data collection device according to claim 11, wherein said cover portion is hingedly detachable from said base portion.

* * * * *